United States Patent
Yale

[15] 3,666,866

[45] May 30, 1972

[54] INHALATION ANESTHETIC

[72] Inventor: Harry Louis Yale, New Brunswick, N.J.

[73] Assignee: E. R. Squibb & Sons, Inc., Princeton, N.J.

[22] Filed: June 2, 1966

[21] Appl. No.: 554,671

Related U.S. Application Data

[63] Continuation-in-part of Ser. No. 365,173, May 5, 1964, abandoned.

[52] U.S. Cl. ............................................424/350, 260/653
[51] Int. Cl. .........................................................A61k 13/00
[58] Field of Search..................167/52.6; 260/653; 365/173; 424/350

[56] References Cited

UNITED STATES PATENTS 3,097,133  7/1963  Suckling...............................167/52.6
3,177,260  4/1965  Murray..................................167/52.6

OTHER PUBLICATIONS

Clements et al. Proc. Natl. Acad. Sci., Vol. 48, 1962, Pages 1008 to 1014
Chemical Abstracts 58: 7264(h)– 7265(a) (Apr. 1963)

*Primary Examiner*—Jerome D. Goldberg
*Attorney*—Lawrence S. Levinson, Merle J. Smith and Theodore J. Criares

[57] ABSTRACT

This invention relates to the compound, 3-bromo-3-chloro-1,1,1,2,2-pentafluoropropane and its use as an inhalation anesthetic.

9 Claims, No Drawings

INHALATION ANESTHETIC

This application is a continuation-in-part of my application, Ser. No. 365,173, filed May 5, 1964, now abandoned.

This invention relates to a new chemical compound and more particularly to a new non-explosive inhalation anesthetic, compositions and azeotropes containing the same, and the use of these as inhalation anesthetics.

The new compound of this invention is 3-bromo-3-chloro-1,1,1,2,2-pentafluoropropane, a compound of the formula: $CF_3CF_2CHBrCl$. It has been found that this compound is an effective inhalation anesthetic which has certain therapeutically meaningful advantages when compared with other known halogenated hydrocarbon anesthetics, such as trifluoromethylbromochloromethane.

The new compound of this invention is prepared by either reacting trifluoromethyldifluoromethylchloromethane ($CF_3CF_2CH_2Cl$) with bromine or trifluoromethyldifluoromethylbromomethane ($CF_3CF_2CH_2Br$) with chlorine. The reaction is preferably conducted in the vapor phase at an elevated temperature, such as a temperature of about 350° C. to about 500° C.; the molar ratio of halogen (i.e. bromine or chlorine) to the halogenated propane reactant being preferably about 1 to 3.

The compound of this invention has also been found to form an azeotrope with diethyl ether, the weight ratio being about 2.5 percent of diethyl ether and about 97.5 percent of 3-bromo-3-chloro-1,1,1,2,2-pentafluoropropane. The azeotrope can be prepared simply either by mixing the two ingredients in the correct proportion or by mixing in other proportions followed by fractional distillation.

For use as an inhalation anesthetic, the compound of this invention or its azeotrope with diethyl ether is administered with a source of oxygen to an air-breathing animal (such as a mammal, e.g., a dog or a cat), by the well-known open drop method. Among the sources of oxygen can be mentioned oxygen itself, a mixture of oxygen and nitrogen, a mixture of oxygen and helium, and, more commonly, air. Nitrous oxide, e.g., up to about 30 percent (vol./vol.) may also be used in combination with this new anesthetic agent. Desirably, the anesthetic agent is present in a final concentration of about 0.4 to about 10 percent (vol./vol.) and optimally at a concentration of about 1 to about 4 percent.

If desired a minor proportion of a preservative, such as thymol, chavicol and di-tert.-butylphenol, can be added to the anesthetic. The preservative is preferably present in a proportion of about 0.001 percent to about 0.05 percent, optimally about 0.005 percent to about 0.01 percent, weight/volume.

Tests on dogs have shown that the compound of this invention possesses anesthetic properties when inhaled and causes no lesions in the heart, liver or kidneys. Moreover, during anesthesia, muscle relaxation in the dogs was good, and there was no evidence of potentiation of epinephrine induced cardiac arrhythmias as sometimes occurs when trifluoromethylbromochloromethane is used. Induction was smooth and quick and recovery from anesthesia was more rapid than with trifluoromethylbromochloromethane.

The following examples illustrate the invention (all temperatures being in centigrade):

EXAMPLE 1

3-Bromo-3-chloro-1,1,1,2,2-pentafluoropropane

An immiscible mixture of trifluoromethyldifluoromethylchloromethane and bromine (2:1 molar ratio) is distilled under atmospheric pressure and the distillate, an azeotrope of trifluoromethyldifluoromethylchloromethane and bromine (3:1 molar ratio) is passed into a heated tube at 475°–485°. The rate of addition is adjusted so that the residence time in the tube is about 24 seconds. The vapors emerging from the tube are condensed and the liquid product fractionated to give about 54.4 percent yield of 3-bromo-3-chloro-1,1,1,2,2-pentafluoropropane, b.p. about 70.2°–70.6°, $nD^{25}$ 1.5317, of 99.3 percent purity.

EXAMPLE 2

A mixture of trifluoromethyldifluoromethylbromomethane and chlorine (3:1 molar ratio) is passed into a heated tube at 370°–380°. The rate of addition is adjusted so that the residence time is about 18 seconds. The yield of 3-bromo-3-chloro-1,1,1-2,2-pentafluoropropane is about 66 percent.

EXAMPLE 3

Five liters of 3-bromo-3-chloro-1,1,1,2,2-pentafluoropropane is mixed with 0.85 grams of thymol and the mixture is packaged under nitrogen in brown bottles designed to seal with an aluminum inner seal.

EXAMPLE 4

3-Bromo-3-chloro-1,1,1,2,2-pentafluoropropane Diethyl Ether Azeotrope

A mixture of 14.0 g. of 3-bromo-3-chloro-1,1,1,2,2-pentafluoropropane and 7.0 g. of diethyl ether is prepared. The exothermic reaction raises the temperature of the mixture about 5°. The mixture is distilled through a 15 cm. Vigreux column. Following a forerun of about 13.6 g. (b.p. 35°–71°), there is obtained a fraction, b.p. about 71°, weighing about 5.4 g. This fraction is analyzed by vapor phase chromatography and found to contain about 2.5 percent of diethyl ether and about 97.5 percent of 3-bromo-3-chloro-1,1,1,2,2-pentafluoropropane.

The invention may be variously otherwise embodied within the scope of the appended claims.

What is claimed is:

1. 3-Bromo-3-chloro-1,1,1,2,2-pentafluoropropane.

2. The azeotropic mixture of 97.5 percent of the compound of claim 1 and 2.5 percent of diethyl ether.

3. An inhalation anesthetic comprising an effective amount for inducing anesthesia of the compound of claim 1 and a minor amount of a preservative.

4. The composition of claim 3, wherein the preservative is thymol.

5. A method of inducing anesthesia which comprises administering by inhalation to an air-breathing animal an effective amount for inducing anesthesia of a mixture of the compound of claim 1 and a source of oxygen.

6. The method of claim 5 wherein the compound of claim 1 is present in a concentration of about 1 percent to about 4 percent.

7. The method of claim 6 wherein the source of oxygen is air.

8. The method of claim 5 wherein the composition contains nitrous oxide.

9. A method of inducing anesthesia which comprises administering by inhalation to an air-breathing animal an effective amount for inducing anesthesia of the azeotropic mixture of claim 2.

* * * * *